(12) United States Patent
Okada

(10) Patent No.: US 8,154,430 B2
(45) Date of Patent: Apr. 10, 2012

(54) DIGITAL RECORDING APPARATUS AND METHOD, DIGITAL REPRODUCTION APPARATUS AND METHOD, AND DIGITAL DATA CONVERSION APPARATUS

(75) Inventor: Shinya Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/129,062

(22) Filed: May 29, 2008

(65) Prior Publication Data
US 2008/0300868 A1    Dec. 4, 2008

(30) Foreign Application Priority Data

May 30, 2007  (JP) ............................... P2007-143923

(51) Int. Cl.
*H03M 7/00*  (2006.01)
(52) U.S. Cl. ...................... 341/61; 369/47.19
(58) Field of Classification Search .............. 341/61; 369/47.19, 47.2, 59.21, 59.22, 47.16, 59.25, 369/47.1, 47.11, 47.15, 59.2, 47.22, 275.3
See application file for complete search history.

(56) References Cited

U.S. PATENT DOCUMENTS

| 6,160,953 | A | 12/2000 | Fuchigami et al. | |
|---|---|---|---|---|
| 6,636,474 | B1 * | 10/2003 | Tanaka et al. ............. | 369/275.3 |

FOREIGN PATENT DOCUMENTS

| EP | 0 845 779 | 6/1998 |
|---|---|---|
| JP | 63 81656 | 4/1988 |
| JP | 8-22671 | 1/1996 |
| JP | 8-287600 | 11/1996 |
| JP | 9 261071 | 10/1997 |
| JP | 2000-90587 | 3/2000 |
| JP | 2001 5499 | 1/2001 |
| JP | 2002-251836 | 9/2002 |

OTHER PUBLICATIONS

Yoshio Yamasaki, "AD/DA Converter and Digital Filter", Journal of the Acoustical Society of Japan, vol. 46, No. 3 (1990).

* cited by examiner

*Primary Examiner* — Joseph Lauture
(74) *Attorney, Agent, or Firm* — Frommer Lawrence & Haug LLP; William S. Frommer

(57) ABSTRACT

A digital recording apparatus for recording 1-bit digital audio data of a first sampling frequency on a recording medium in accordance with the recording format of multi-bit PCM data of a second sampling frequency includes a storage section to which input 1-bit digital audio data of the first sampling frequency is written; an encoder configured to read, from the storage section, the 1-bit digital audio data at a clock synchronized with the second sampling frequency and configured to convert the 1-bit digital audio data in such a manner that bits of the 1-bit digital audio data are arrayed in a 1-bit data area provided in the multi-bit PCM data that is in accord with the recording format; and a recorder configured to record data output from the encoder on the recording medium in accordance with the recording format.

10 Claims, 12 Drawing Sheets

1bitIF
$V_{OH} > 2.4V$
$V_{OL} < 0.55V$

AES3
$V_O = V_H - V_L$: 1.0V (0.8 TO 1.2V)
D.C.Offset < 50mV

FIG. 8A
50/25    2,822,400 bit/50 Hz = 56,448 bit/f
field
field ID    0    0
1bitData pack    56448 56448
FIG. 8B
24    2,822,400 bit/24 Hz = 117,600 bit/F(58,800 bit/f)
field
field ID    0    0
1bitData pack    58800 58800
FIG. 8C
23.98    2,822,400 bit/(24 Hz×1,000/1,001)=117,717.64 bit/F(58,858.8 bit/f)
field
field ID    1    0    1
1bitData pack    58859 58858 58859 58859 58859 58858
58,858 bit×1f+58,859 bit×4f=294,294 bit=(58,858.8 bit×5f)

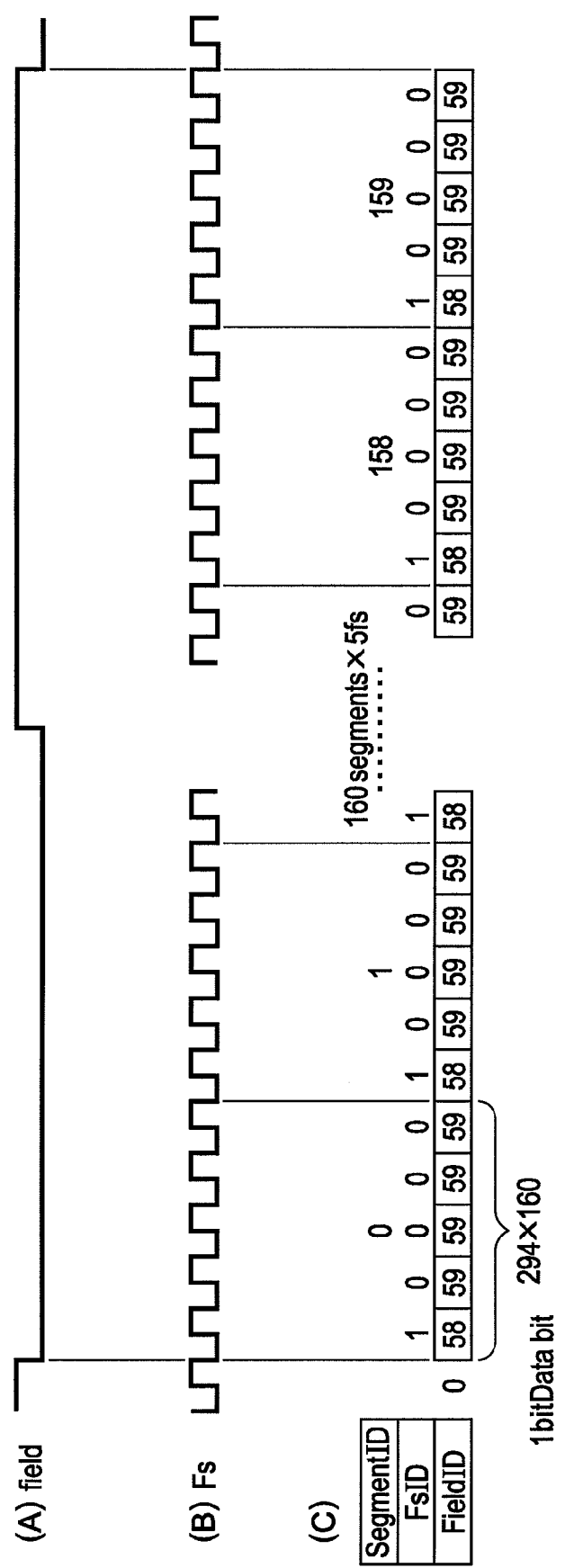

FIG. 10A

FsID=1

| | MSB | | | | | | | | | | | | | | | | | | | | | LSB | |
|---|---|---|---|---|---|---|---|---|---|---|---|---|---|---|---|---|---|---|---|---|---|---|---|
| 1 ch | S7 | S6 | S5 | S4 | D | D | D | D | D | D | D | D | D | D | D | D | D | D | D | D | D | D | 20 bit |
| 2 ch | S3 | S2 | S1 | S0 | | D | D | D | D | D | D | D | D | D | D | D | D | D | D | D | D | D | 19 bit |
| 3 ch | F1 | F0 | f1 | f0 | | D | D | D | D | D | D | D | D | D | D | D | D | D | D | D | D | D | 19 bit |

FIG. 10B

FsID=0

| | MSB | | | | | | | | | | | | | | | | | | | | | LSB | |
|---|---|---|---|---|---|---|---|---|---|---|---|---|---|---|---|---|---|---|---|---|---|---|---|
| 1 ch | S7 | S6 | S5 | S4 | D | D | D | D | D | D | D | D | D | D | D | D | D | D | D | D | D | D | 20 bit |
| 2 ch | S3 | S2 | S1 | S0 | D | D | D | D | D | D | D | D | D | D | D | D | D | D | D | D | D | D | 20 bit |
| 3 ch | F1 | F0 | f1 | f0 | | D | D | D | D | D | D | D | D | D | D | D | D | D | D | D | D | D | 19 bit |

FIG. 12A

FsID=1

| | MSB | | | | | | | | | | | | | | | | | | | LSB | |
|---|---|---|---|---|---|---|---|---|---|---|---|---|---|---|---|---|---|---|---|---|---|
| 1 ch | S7 | S6 | S5 | S4 | D | D | D | D | D | D | D | D | D | D | D | D | D | D | D | D | 20 bit |
| 2 ch | S3 | S2 | S1 | S0 | | D | D | D | D | D | D | D | D | D | D | D | D | D | D | D | 19 bit |
| 3 ch | F1 | F0 | f1 | f0 | | D | D | D | D | D | D | D | D | D | D | D | D | D | D | D | 19 bit |

FIG. 12B

FsID=0

| | MSB | | | | | | | | | | | | | | | | | | | LSB | |
|---|---|---|---|---|---|---|---|---|---|---|---|---|---|---|---|---|---|---|---|---|---|
| 1 ch | S7 | S6 | S5 | S4 | D | D | D | D | D | D | D | D | D | D | D | D | D | D | D | D | 20 bit |
| 2 ch | S3 | S2 | S1 | S0 | D | D | D | D | D | D | D | D | D | D | D | D | D | D | D | D | 20 bit |
| 3 ch | F1 | F0 | f1 | f0 | | D | D | D | D | D | D | D | D | D | D | D | D | D | D | D | 19 bit |

FIG. 12C

FsID=3

| | | | | | | | | | | | | | | | | | | | | | |
|---|---|---|---|---|---|---|---|---|---|---|---|---|---|---|---|---|---|---|---|---|---|
| 1 ch | S7 | S6 | S5 | S4 | | | | | | | | | | | | | | | | | 0 bit |
| 2 ch | S3 | S2 | S1 | S0 | | | | | | | | | | | | | | | | | 0 bit |
| 3 ch | F1 | F0 | f1 | f0 | | | | | | | | | | | | | | | | | 0 bit |

DIGITAL RECORDING APPARATUS AND METHOD, DIGITAL REPRODUCTION APPARATUS AND METHOD, AND DIGITAL DATA CONVERSION APPARATUS

CROSS REFERENCES TO RELATED APPLICATIONS

The present invention contains subject matter related to Japanese Patent Application JP 2007-143923 filed in the Japanese Patent Office on May 30, 2007, the entire contents of which are incorporated herein by reference.

BACKGROUND OF THE INVENTION

1. Field of the Invention

The present invention relates to a digital recording apparatus and method, a digital reproduction apparatus and method, and a digital data conversion apparatus. More particularly, the present invention relates to a digital recording apparatus and method for converting sigma-delta ($\Sigma\Delta$) modulated 1-bit digital audio data (1-bit data) into a PCM (Pulse Code Modulation) digital signal (PCM data) and recording it, to a digital reproduction apparatus and method for reproducing a recorded digital signal and obtaining the original 1-bit digital audio data, and to a digital data conversion apparatus.

2. Description of the Related Art

As apparatuses for recording and reproducing a video/audio signal, VTR apparatuses using video tape have hitherto been known. In recent years, digital VTR apparatuses for recording and reproducing digital video/audio data have come to be often used. Furthermore, apparatuses using a disk, a memory, or the like as a recording medium have been supplied. The sampling frequency of a digital audio signal in a digital video apparatus, such as such a digital VTR apparatus, is usually 48 kHz.

In comparison, in the case of a format of a CD (Compact Disc) or the like, with which an audio signal is converted into a digital form and recorded and reproduced, the sampling frequency is often 44.1 kHz. For example, in the CD-DA (Digital Audio) standard, a PCM (Pulse Code Modulation) digital signal (PCM data) having a sampling frequency of 44.1 kHz and having a number of quantization bits of 16 is used.

On the other hand, as another method for a digital audio signal, a method called sigma-delta ($\Sigma\Delta$) modulation has been proposed in, for example, "AD/DA converter and digital filter", The Journal of the Acoustical Society of Japan, Volume 46, No. 3 (1990), pp. 251 to 257. One-bit digital audio data (1-bit data) obtained by this $\Sigma\Delta$ modulation has a very high sampling frequency and a short data word length (for example, the sampling frequency is 64 times as high as 44.1 kHz and the data word length is 1 bit) in comparison with the format of data used for digital audio of a CD or the like of the related art, and has advantages such that a transmittable frequency band is wide.

Furthermore, even for a 1-bit signal, $\Sigma\Delta$ modulation enables a high dynamic range to be ensured in an audio band that is at a frequency lower than an oversampling frequency of 64 times higher. By utilizing this advantage, the method can be applied to recording and reproduction with high sound quality and data transmission.

This 1-bit $\Sigma\Delta$ modulated audio signal is used as a signal of a DSD (Direct Stream Digital) method in so-called super audio CD (SACD) as the next generation CD standard proposed by Sony Corporation and Philips Corporation.

As an example of the related art, Japanese Unexamined Patent Application Publication No. 9-261071 discloses a mastering apparatus for 1-bit digital audio data (1-bit data) of the DSD method. Japanese Unexamined Patent Application Publication No. 2001-5499 discloses a music data information transmission method and apparatus for digitally transmitting music data information, such as a sampling frequency of music data to be transmitted in digital music data transmission.

SUMMARY OF THE INVENTION

When 1-bit data having the above-described sampling frequency of 64×44.1 kHz (=2.8224 MHz) is to be recorded and reproduced by a digital video device having an audio sampling frequency of 48 kHz, such as a digital VTR apparatus, it is necessary to temporarily convert the 1-bit data into an analog signal, sample it at a sampling frequency of 48 kHz, and convert it into a PCM digital audio signal (PCM data). Signal processing, such as a filtering process, becomes necessary for conversion into analog and digital forms. As a consequence, deterioration of the sound quality occurs.

The present invention has been proposed in view of such circumstances of the related art. It is desirable to provide a digital recording apparatus and method, a digital reproduction apparatus and method, and a digital data conversion apparatus, which are capable of minimizing the deterioration of sound quality when 1-bit digital audio data (1-bit data) of the system in which the sampling frequency is 44.1 kHz is to be recorded and reproduced into and from a recording apparatus in which the sampling frequency is 48-kHz series.

According to an embodiment of the present invention, there is provided a digital recording apparatus for recording 1-bit digital audio data of a first sampling frequency on a recording medium in accordance with the recording format of multi-bit PCM data of a second sampling frequency, the digital recording apparatus including: storage section to which input 1-bit digital audio data of the first sampling frequency is written; an encoder configured to read, from the storage section, the 1-bit digital audio data at a clock synchronized with the second sampling frequency and configured to convert the 1-bit digital audio data in such a manner that bits of the 1-bit digital audio data are arrayed in a 1-bit data area provided in the multi-bit PCM data that is in accord with the recording format; and a recorder for recording data output from the encoder on the recording medium in accordance with the recording format.

The digital recording apparatus may further include a clock generator for achieving synchronization between the first sampling frequency and the second sampling frequency and for generating a clock of an integral multiple of each sampling frequency, wherein the 1-bit digital audio data that is input at the first clock of an integral multiple of the first sampling frequency from the clock generator is written in the storage section, 1-bit digital audio data is read from the storage section at a second clock of an integral multiple of the second sampling frequency, and the encoder is driven at the second clock.

The first sampling frequency may be 2.8224 MHz (=64× 44.1 kHz), the second sampling frequency may be 48 kHz, the clock generator includes a master clock oscillator for generating a clock of a frequency 512 times as high as 44.1 kHz, a multiplier for multiplying a master clock from the master clock oscillator to be 5 times higher, and a frequency divider for frequency-dividing the clock from the multiplier by 1/2352, and may output the master clock as the first clock, and the clock 512 times as high as 48 kHz that is the second sampling frequency may be used as the second clock.

The recorder may record 48 kHz/24-bit PCM data for 12 channels as the multi-bit PCM data together with digital video data. 20 bits among 24 bits of each sample of the 48 kHz/24-bit PCM data may be used as the 1-bit data area, and by using the 48 kHz/24-bit PCM data for three channels having the 1-bit data area, 1 channel of the 1-bit digital audio data may be allocated. By using identification information for identifying the correspondence with the field of the digital video data, the position in the field, and the number of allocated bits with respect to the 48 kHz/24-bit PCM data, the identification information is preferably arranged in a 12-bit area for three channels of 4 bits, excluding the 1-bit data area, among the 24 bits of each sample of the PCM data.

According to another embodiment of the present invention, there is provided a digital recording method for recording 1-bit digital audio data of a first sampling frequency on a recording medium in accordance with the recording format of multi-bit PCM data of a second sampling frequency, the digital recording method including the steps of: receiving the 1-bit digital audio data of the first sampling frequency and writing the 1-bit digital audio data on a storage section; reading the 1-bit digital audio data from the storage section at a clock synchronized with the second sampling frequency; encoding the 1-bit digital audio data read from the storage section so that bits are arrayed in a 1-bit data area provided in multi-bit PCM data that is in accord with the recording format; and recording the encoded output data on a recording medium in accordance with the recording format.

According to another embodiment of the present invention, there is provided a digital data conversion apparatus for converting 1-bit digital audio data of a first sampling frequency in accordance with the recording format of multi-bit PCM data of a second sampling frequency, the 1-bit digital audio data being recorded on a recording medium in accordance with the recording format, the digital data conversion apparatus including: a storage section to which input 1-bit digital audio data of the first sampling frequency is written; and an encoder configured to read, from the storage section, the 1-bit digital audio data at a clock synchronized with the second sampling frequency and configured to convert the 1-bit digital audio data so that bits of the 1-bit digital audio data are arrayed in a 1-bit data area provided in the multi-bit PCM data that is in accord with the recording format.

According to another embodiment of the present invention, there is provided a digital reproduction apparatus for reproducing a recording medium on which 1-bit digital audio data of a first sampling frequency is recorded in accordance with the recording format of multi-bit PCM data of a second sampling frequency, the digital reproduction apparatus including: a reproduction section for reading the multi-bit PCM data that is in accord with the recording format of the recording medium, the multi-bit PCM data being converted and recorded on the recording medium in such a manner that bits of the 1-bit digital audio data are arrayed in a 1-bit data area provided in the multi-bit PCM data that is in accord with the recording format; a decoder configured to return data from the 1-bit data area provided in the multi-bit PCM data reproduced by the reproduction section to a data sequence of the 1-bit digital audio data and configured to output the data sequence at a clock synchronized with the second sampling frequency; and a storage section to which the 1-bit digital audio data of the second sampling frequency from the decoder is written and from which the original 1-bit digital audio data is read at a clock synchronized with the first sampling frequency.

According to another embodiment of the present invention, there is provided a digital reproduction method for reproducing a recording medium on which 1-bit digital audio data of a first sampling frequency is recorded in accordance with the recording format of multi-bit PCM data of a second sampling frequency, the digital reproduction method including the steps of: reading multi-bit PCM data that is in accord with the recording format of the recording medium, the multi-bit PCM data being converted and recorded on the recording medium, in such a manner that bits of the 1-bit digital audio data are arrayed in a 1-bit data area provided in the multi-bit PCM data that is in accord with the recording format; performing decoding in such a manner that data from the 1-bit data area provided in the multi-bit PCM data reproduced in the reproduction is returned to a data sequence of the 1-bit digital audio data and is output at a clock synchronized with the second sampling frequency; writing the 1-bit digital audio data of the second sampling frequency to a storage section, the 1-bit digital audio data being decoded in the decoding; and reading the original 1-bit digital audio data from the storage section at a clock synchronized with the first sampling frequency.

According to another embodiment of the present invention, there is provided another digital data conversion apparatus for inversely converting 1-bit digital audio data of a first sampling frequency into original 1-bit digital audio data, the 1-bit digital audio data being recorded on a recording medium in such a manner that bits of the 1-bit digital audio data are arrayed in a 1-bit data area provided in multi-bit PCM data in accordance with the recording format of the multi-bit PCM data of a second sampling frequency, the digital data conversion apparatus including: a decoder configured to return data read from the 1-bit data area in the multi-bit pulse code modulation data to a data sequence of the 1-bit digital audio data and configured to output the data sequence at a clock synchronized with the second sampling frequency; and a storage section to which the 1-bit digital audio data of the second sampling frequency from the decoder is written and from which the original 1-bit digital audio data is read at a clock synchronized with the first sampling frequency.

According to the embodiments of the present invention, when 1-bit digital audio data of a first sampling frequency is to be converted in accordance with the recording format of multi-bit PCM data of a second sampling frequency for recording on a recording medium, the 1-bit digital audio data of the first sampling frequency is input and written into a storage section, the 1-bit digital audio data is read from the storage section at a clock synchronized with the second sampling frequency, and the read 1-bit digital audio data is converted so that bits are arrayed in a 1-bit data area provided in the multi-bit PCM data that is in accord with the recording format. As a result, it is possible to minimize the deterioration of sound quality and record the 1-bit digital audio data in accordance with the recording format of the multi-bit PCM data, making it possible to reversely convert the recorded data into the original 1-bit digital audio data.

BRIEF DESCRIPTION OF THE DRAWINGS

FIGS. 7A and 7B are illustrations of assignment for each field of 1-bit data when a field frequency is 60 Hz or 59.94 Hz;

FIGS. 8A, 8B, and 8C are illustrations of assignment for each field of 1-bit data when the field frequency is 50 Hz, when the frame frequency is 24 Hz, and when the frame frequency is 23.98 Hz, respectively;

FIG. 9 illustrates the assignment of 1-bit data for each sampling period in one field when the field frequency is 60 Hz;

FIGS. 10A and 10B illustrate the assignment of 1-bit data to 3 samples for three channels in 1 sampling period when the field frequency is 60 Hz;

FIGS. 12A, 12B, and 12C illustrate the assignment of 1-bit data for 3 samples, which correspond to three channels in 1 sampling period, when the field frequency is 59.94 Hz.

DESCRIPTION OF THE PREFERRED EMBODIMENTS

Specific embodiments to which the present invention is applied will be described below with reference to the drawings.

Figure 1:
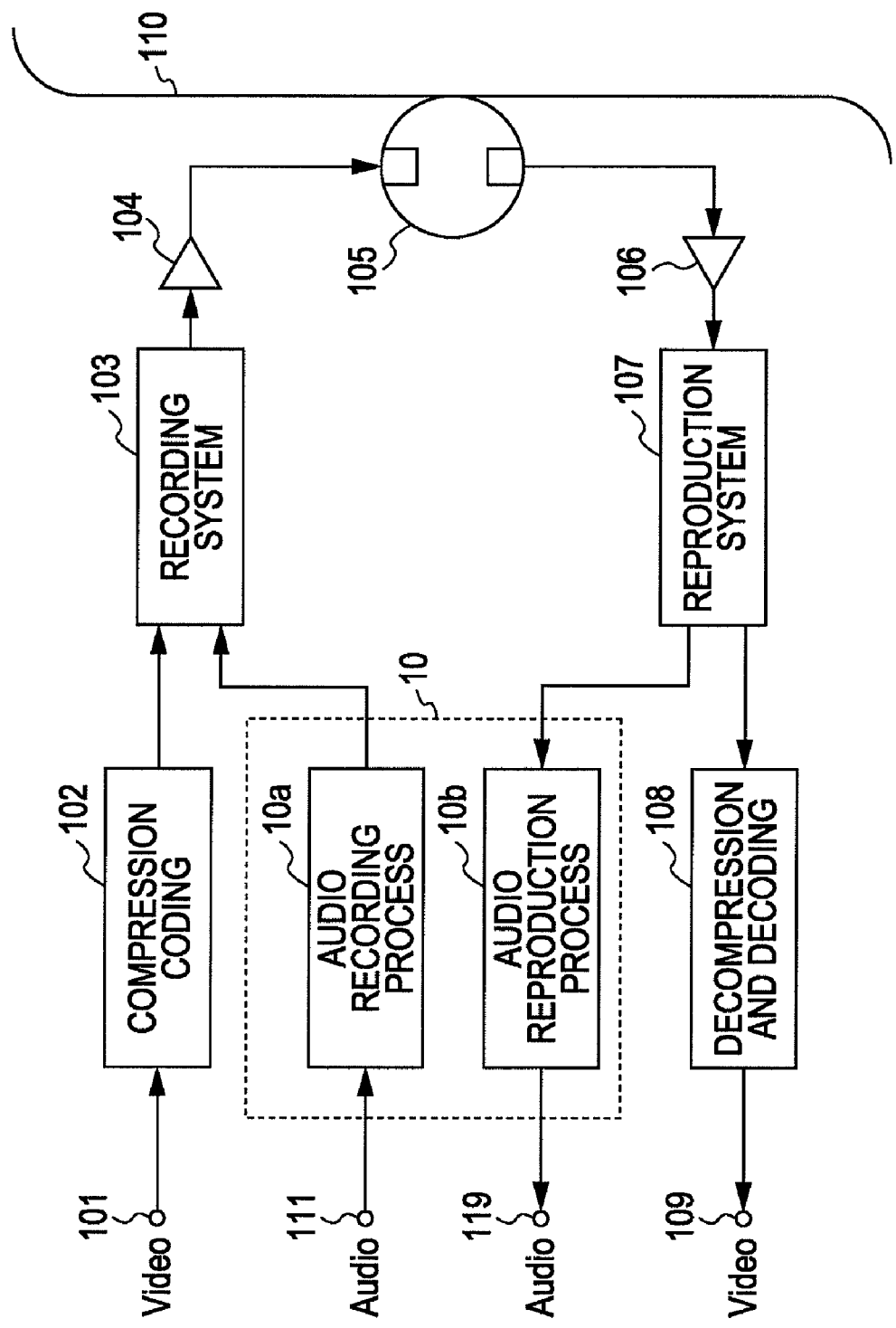
FIG. 1 is a block diagram showing schematic configuration of a digital VTR apparatus as an example of a recording and reproduction apparatus for use in an embodiment of the present invention.

FIG. 1 is a block diagram schematically showing a specific example of a digital VTR apparatus serving as a recording and reproduction apparatus used in an embodiment of the present invention. The digital VTR apparatus shown in FIG. 1 records and reproduces a digital video/audio signal to and from a so-called video tape 110 which is a tape-shaped recording medium.

Although the sampling frequency of the digital audio data to be recorded and reproduced to and from the digital VTR apparatus is 48 kHz, in this embodiment, a case is assumed in which, in order to record 1-bit data (1-bit digital audio data) having a sampling frequency of 44.1-kHz series in the digital VTR apparatus, the 1-bit data is converted by bit rearrangement into PCM data of a sampling frequency of 48 kHz, and the PCM data is reversely converted into 1-bit data during reproduction. Examples of the 1-bit data include 1-bit ΣΔ modulated audio signal data of a DSD (Direct Stream Digital) method in the so-called super audio CD (SACD) as the next generation CD standard proposed by Sony Corporation and Philips Corporation. The sampling frequency of 1-bit data of the DSD method is 2.8224 MHz (=64×44.1 kHz).

In FIG. 1, digital video data input to a video input terminal 101 is sent to a compression coder 102, whereby it is compressed and coded, and is sent to a recording system 103. Furthermore, digital audio data input to an audio input terminal 111 is sent to a recording audio processing circuit unit 10a of an audio processor 10, whereby an audio process for recording is performed, and is sent to the recording system 103. In the recording system 103, compressed video data from the compression coder 102 and digital audio data from the recording audio processing circuit unit 10a are converted into a recording signal that is in accord with a predetermined recording format, and is supplied to a rotary head 105 via a recording amplifier 104, thereby being recorded in oblique recording tracks (helical tracks) of the video tape 110.

Figure 2:
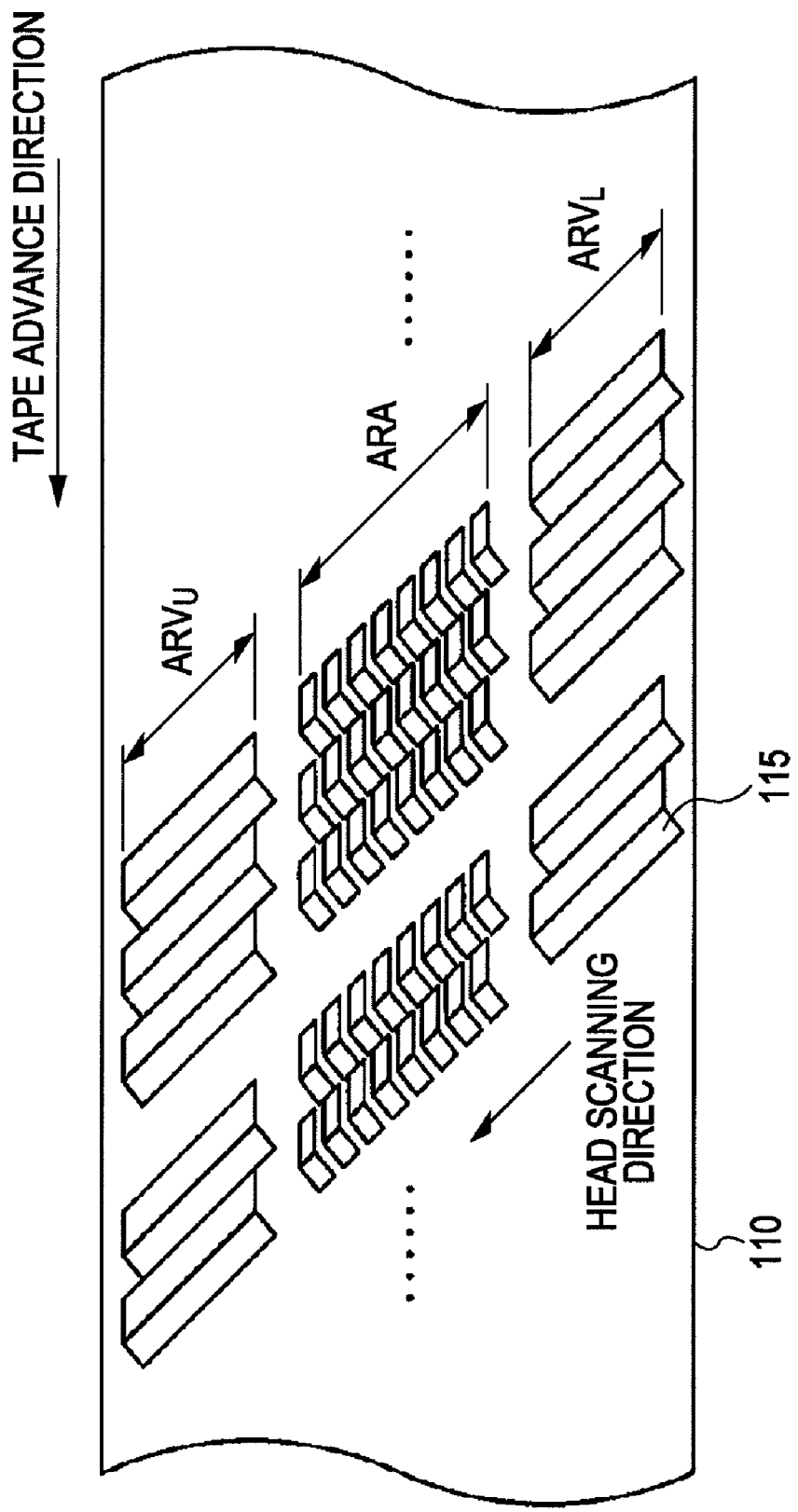
FIG. 2 shows an example of a recording format on a video tape on which recording is performed by the digital VTR apparatus.

FIG. 2 shows an example of a recording format used on the video tape 110. On the video tape 110, recording tracks 115 that are inclined to the longitudinal direction that is tape advance direction are sequentially formed. In this specific example, the recording azimuths in two mutually adjacent recording tracks 115 differ from each other. The areas on the scanning start side and the scanning end side of the recording tracks 115 are set as video data areas ARVU and ARVL, respectively, and the area sandwiched between the video data areas ARVU and ARVL is set as an audio data area ARA.

A reproduction signal obtained by scanning the recording tracks 115 of the video tape 110 shown in FIG. 2 by using a rotary head 105 of FIG. 1 is amplified by a reproduction amplifier 106 and is sent to a reproduction system 107, whereby signal reproduction processes including waveform equalization and demodulation processes are performed. Then, digital video data is sent to a decompression decoder 108, and digital audio data is sent to a reproduction audio processing circuit unit 10b of the audio processor 10. In the decompression decoder 108, a decompression decoding process as a process reverse to the compression encoding process performed in the compression coder 102 during video recording is performed, and the obtained digital video data is retrieved from an output terminal 109. In the reproduction audio processing circuit unit 10b, a process reverse to the process performed in the recording audio processing circuit unit 10a is performed, and the obtained digital audio data is retrieved from the output terminal 119.

Here, as an example of the standard of digital audio data that is recorded and reproduced by a digital VTR apparatus, an example in which 24-bit PCM data is recorded and reproduced for 12 channels at a sampling frequency of 48 kHz is assumed. In this embodiment, as described above, 1-bit data having a sampling frequency of 64×44.1 kHz (=2.8224 MHz) is converted by bit rearrangement into a PCM data recording frame of a sampling frequency of 48 kHz/24 bits, and the 1-bit data is recorded by using a recording frame for three channels of audio channels of 12 channels, as will be described later.

Figure 3:
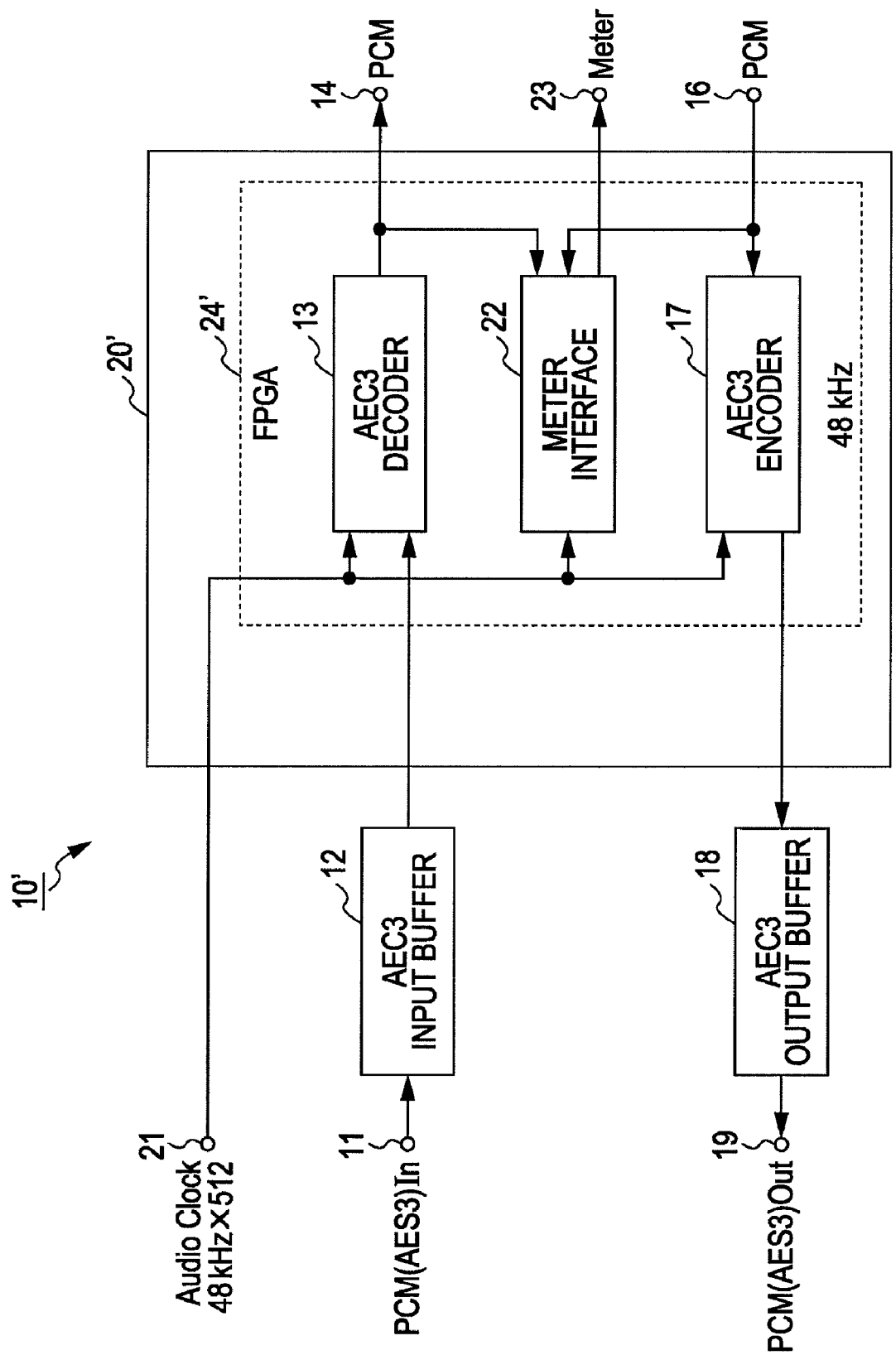
FIG. 3 is a block diagram showing an example of the configuration of an audio processor of the related art of a digital VTR apparatus.
Figure 4:
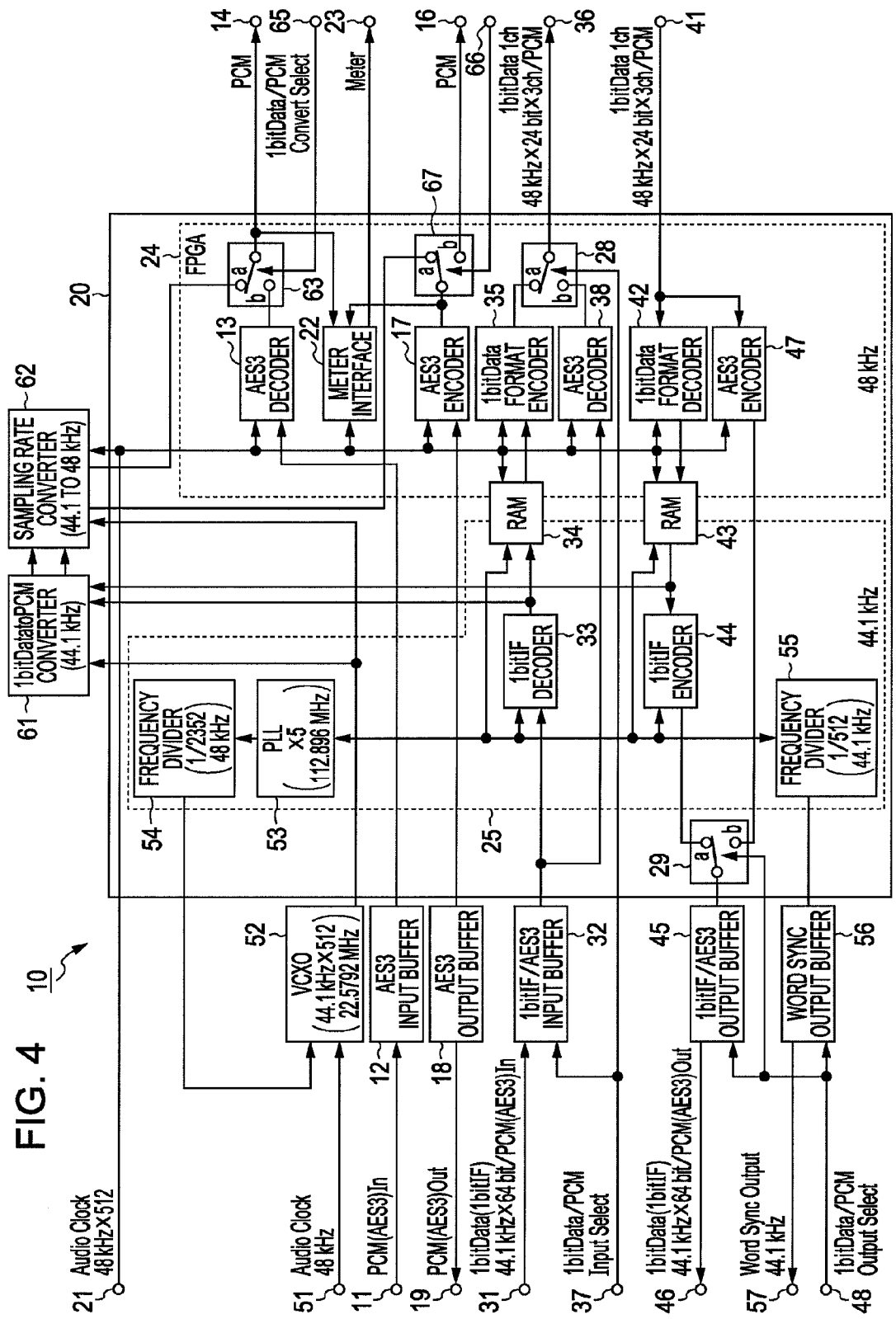
FIG. 4 is a block diagram showing an example of the configuration of an audio processor of a digital VTR apparatus for use in an embodiment of the present invention.

That is, the audio processor for original 48 kHz/24-bit PCM audio recording and reproduction, of the digital VTR apparatus has a configuration like an audio processor 10' shown in FIG. 3. In contrast, as shown in FIG. 4, the audio processor of this embodiment is the audio processor 10 in which a configuration for converting 1-bit digital audio data of 44.1-kHz series by bit rearrangement into PCM data (PCM digital audio data) of 48-kHz series or for performing reverse conversion is added. First, a description will be given of a configuration for recording and reproducing 48 kHz/24-bit PCM data as common parts of the audio processor 10' of FIG. 3 and the audio processor 10 of FIG. 4.

In FIGS. 3 and 4, 48 kHz/24-bit PCM data is input to an input terminal 11. The PCM data in this example is transmitted in accordance with an AES3 format (AES-3id-2001), which is one of the standards of the AES/EBU (Audio Engineering Society/European Broadcasting Union), which is a digital audio standard. A coaxial cable is used for signal transmission, and a BNC connector is used for the input terminal 11. The PCM data from the input terminal 11 is sent to an AES3 decoder 13 via an AES3 input buffer 12, and is converted from the format of the AES3 standard into a PCM data format for VTR recording by the AES3 decoder 13.

Thereafter, the PCM data is retrieved via an output terminal 14 and is sent to the recording system 103 of FIG. 1.

The PCM data from the reproduction system 107 of FIG. 1 is sent to an AES3 encoder 17 via an input terminal 16 of FIGS. 3 and 4, whereby the PCM data is converted into PCM data of the format of the AES3 standard, and is retrieved from an output terminal 19 via an AES3 output buffer 18. For the output terminal 19, a BNC connector is used, and a coaxial cable is used for signal transmission.

A clock signal having a frequency of 48 kHz×512 is input, as an audio clock of PCM data of the digital VTR apparatus, to an input terminal 21, and is supplied to the AES3 decoder 13, an AES3 encoder 17, and a meter interface 22. The PCM data from the AES3 decoder 13 and the PCM data from the input terminal 16 are input to the meter interface 22, and data for a meter for displaying an audio level meter of the digital VTR apparatus is output and sent to an output terminal 23.

In the example shown in FIGS. 3 and 4, the main circuit of the audio processor 10 (10') is formed by, for example, a so-called FPGA (field Programmable Gate Array) 20 (20'). A block 24 (24') shows a 48-kHz series circuit unit, and a block 25 shows a 44.1-kHz series circuit unit.

Next, a description will be given of parts that are added from the configuration of FIG. 3 in the audio processor 10 of FIG. 4.

Figure 5A:
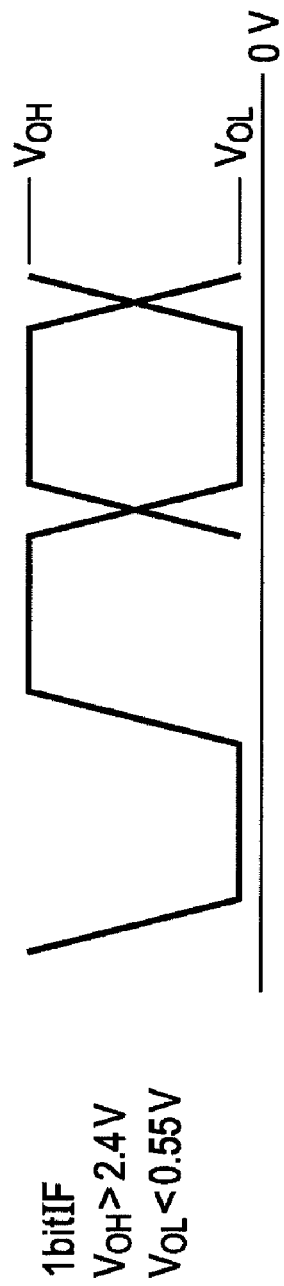
FIGS. 5A and 5B are waveform charts showing specific examples of input/output levels based on a data transmission standard.
Figure 5B:
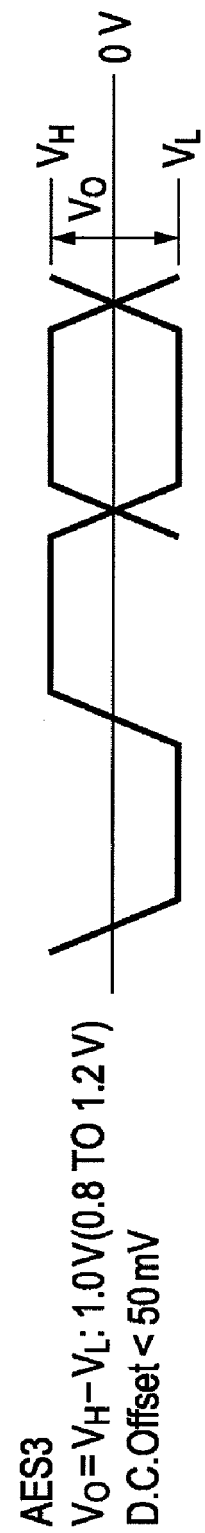

One-bit data (1-bit digital audio data) having a sampling frequency of 2.8224 MHz (=64×44.1 kHz) is input to an input terminal 31 of FIG. 4. This 1-bit data is 1-bit ΣΔ modulated audio signal data of a DSD (Direct Stream Digital) method used for the so-called super audio CD (SACD) described above of Sony Corporation and Philips Corporation, and a standard (1-bit IF) capable of transmitting 1-bit data described above is used for signal transmission. Here, as a specific example of the 1-bit data transmission standard (1-bit IF), SDIF-3 of the SDIF (Sony Digital Interface Format) standard, which is a digital audio transmission standard, presented by Sony Corporation, can be used. In the standard of SDIF-3, transmission and reception are performed using a coaxial cable having a characteristic impedance of 75Ω and a BNC connector, and the input/output level is a TTL level as shown in FIG. 5A. FIG. 5B shows input/output levels of AES3 described above, which take positive and negative values.

As shown in FIGS. 5A and 5B, the input/output levels of the 1-bit data transmission standard (1-bit IF) and AES3 differ from each other, but a coaxial cable and a BNC connector are used for both of them. Therefore, the input terminal 31 can be shared for the input of the 1-bit data and the input of the PCM data. Furthermore, a BNC connector can be similarly used for an output terminal 46, and the output terminal 46 can be shared for the output of the 1-bit data and the output of the PCM data.

Figure 6A:
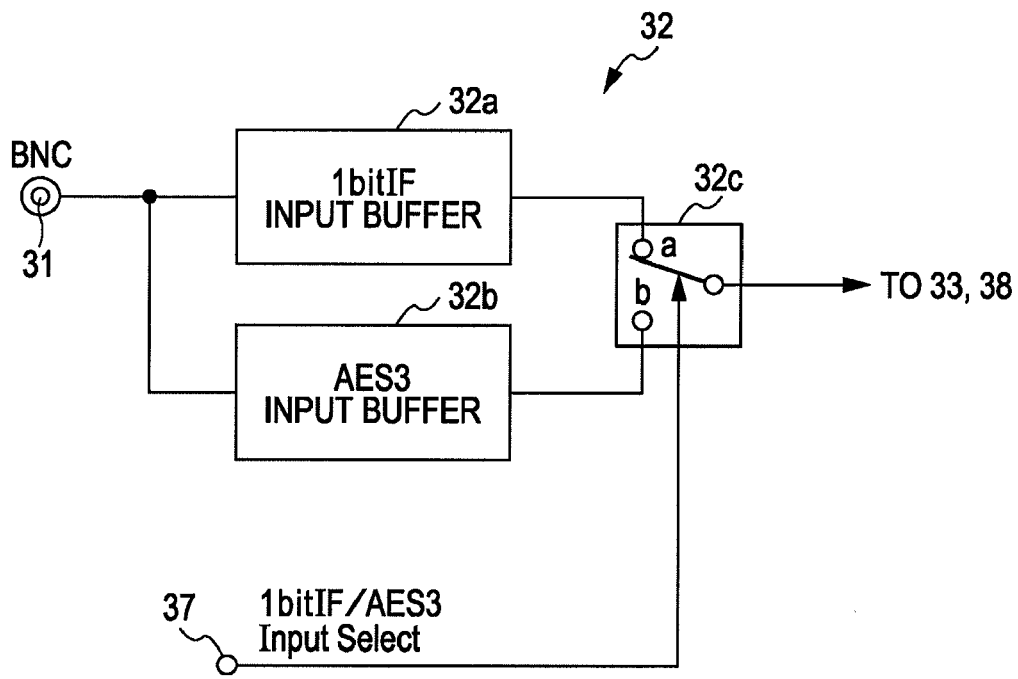
FIGS. 6A and 6B are block diagrams showing examples of input buffers and output buffers by which two different data transmission standards can be switched.

The 1-bit data or the PCM data input to the input terminal 31 is sent to a 1-bit IF/AES3 input buffer 32. The 1-bit IF/AES3 input buffer 32, as shown in, for example, FIG. 6A, is configured in such a manner that data from the input terminal 31 using a BNC connector is sent to a 1-bit IF input buffer 32a and an AES3 input buffer 32b, the output from the 1-bit IF input buffer 32a is sent to a selected terminal a of a selector switch 32c, and the output from the AES3 input buffer 32b is sent to a selected terminal b of the selector switch 32c. The switching of the selector switch 32c is controlled on the basis of a 1-bit data/PCM data input switching control signal from an input terminal 37. The output data from the selector switch 32c is sent to a 1-bit IF decoder 33 and an AES3 decoder 38 of FIG. 4. The 1-bit IF/AES3 input buffer 32 may be made for common use, and a threshold level for an input signal may be switched and selected. In this case, for example, switching control may be performed in such a manner that the threshold level is set to 1.5 V when 1-bit data is input and the threshold level is set to 0 V when PCM data is input.

Figure 6B:
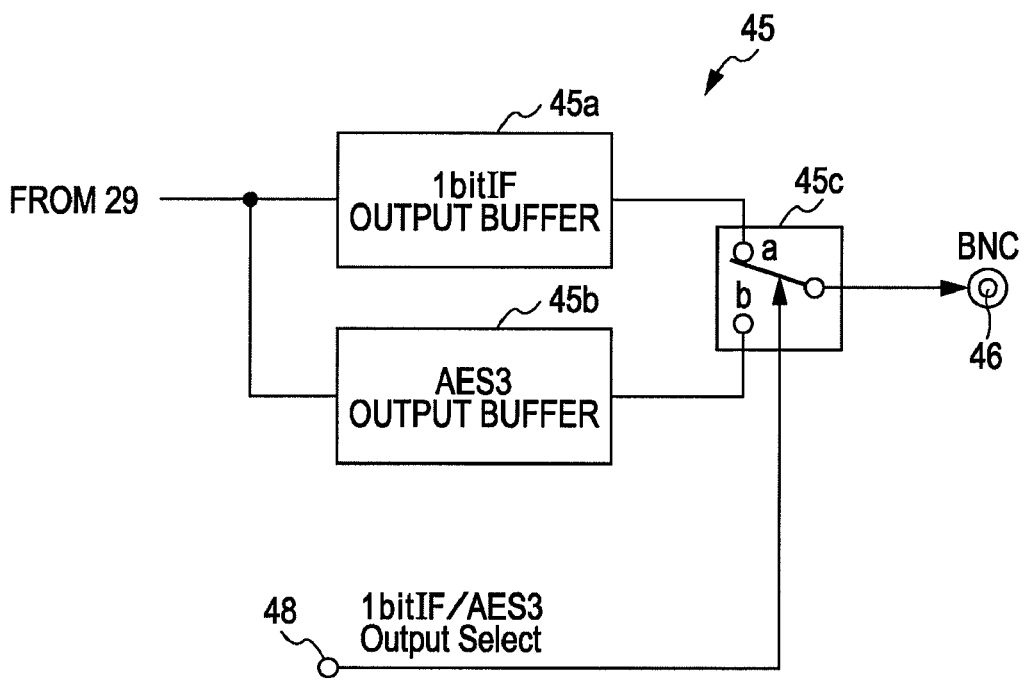

Similarly, a 1-bit IF/AES3 output buffer 45 connected to the output terminal 46 using a BNC connector can be configured as shown in, for example, FIG. 6B. In the example of FIG. 6B, data from the selector switch 29 of FIG. 4 is sent to a 1-bit IF output buffer 45a and an AES3 input buffer 45b, the output from the 1-bit IF input buffer 45a is sent to a selected terminal a of a selector switch 45c, the output from the AES3 input buffer 45b is sent to a selected terminal b of a selector switch 45c, and the output data from the selector switch 32c is sent to the output terminal 46. The switching of the selector switch 45c is controlled on the basis of the 1-bit data/PCM data output switching control signal from the input terminal 48. The 1-bit IF/AES3 output buffer 45 may also be made for common use, so that the output level is switched and selected. In this case, for example, a DC offset may be switched to 1.5 V, the gain may be switched to 3 Vpp when 1-bit data is to be output. The DC offset may be switched to 0 V, and the gain may be switched to 1 Vpp when PCM data is to be output.

Referring back to FIG. 4, the 1-bit data from the 1-bit IF/AES3 input buffer 32 is sent to the 1-bit IF decoder 33 of the 44.1-kHz series circuit block 25, whereby decoding of the transmission standard of 1-bit IF is performed and the data is sent to a RAM (for example, a dual port RAM) 34. In the RAM 34, conversion of a clock frequency from 44.1-kHz series to 48-kHz series is performed, and the data from the RAM 34 is sent to a 1-bit data format encoder 35 of the 48-kHz series circuit block 24. In the 1-bit data format encoder 35, as will be described later, data conversion is performed by bit rearrangement for recording 1-bit data in a recording frame of 48-kHz PCM data, and the conversion output data is sent to the selected terminal a of the selector switch 28. Furthermore, the PCM data from the 1-bit IF/AES3 input buffer 32 is sent to the AES3 decoder 38 of the 48-kHz series circuit block 24, whereby decoding of the transmission standard of AES3 is performed, and thereafter the data is sent to the selected terminal b of the selector switch 28. The switching of the selector switch 28 is controlled on the basis of the 1-bit data/PCM data input switching control signal from the input terminal 37, and the output data from the selector switch 28 is output from the output terminal 36 and is sent to the recording system 103 of FIG. 1.

The data from the reproduction system 107 of FIG. 1 is sent via the input terminal 41 of FIG. 4 to a 1-bit data format decoder 42 and an AES3 encoder 47 of the 48-kHz series circuit block 24. The 1-bit data format decoder 42 returns 1-bit data (data recorded in the PCM recording frame) recorded as 48-kHz PCM data to the original 1-bit data, and performs a reverse conversion process of the 1-bit data format encoder 35. The clock frequency remains to be 48-kHz series as is and is converted into a clock frequency of 44.1-kHz series using a RAM (for example, the dual port RAM) 43. The data from the RAM 43 is sent to the 1-bit IF encoder 44 of the 44.1-kHz series circuit block 25, whereby it is converted into data of the format of a predetermined 1-bit IF transmission standard (for example, the SDIF-3 standard presented by Sony Corporation). The data from the 1-bit IF encoder 44 is sent to the selected terminal a of the selector switch 29. Furthermore, in the AES3 encoder 47, the data from the input terminal 41 is converted into PCM data of the format of the AES3 transmission standard and is sent to the selected terminal b of the selector switch 29. The switching of the selector switch 29 is controlled on the basis of a 1-bit data/PCM data output switching control signal from the input terminal 48, and the data from the selector switch 29 is sent to the 1-bit IF/AES3 output buffer 45.

Next, a description will be given of clock synchronization between 1-bit data having a sampling frequency of 2.8224 MHz (=64×44.1 kHz) and PCM data having a sampling frequency 48 kHz. Generally speaking, a clock of 48 kHz is generated by multiplying and frequency-dividing a master clock of 44.1-kHz series. This clock of 48 kHz is synchronized with the audio clock of the digital VTR apparatus, and 1-bit data to be input/output is rearranged and is recorded and reproduced as PCM data (data of the PCM recording frame) of 48 kHz.

An audio clock of 48 kHz for recording PCM data of the digital VTR apparatus has been input to an input terminal 51 of FIG. 4. This 48-kHz clock is supplied to a VCXO (Voltage Controlled Crystal Oscillator) 52, which is a crystal oscillator, and the VCXO 52 generates a master clock of a frequency 512 times as high as 44.1 kHz (=22.5792 MHz). The master clock from the VCXO 52 is sent to a PLL (Phase Locked Loop) circuit 53, whereby it is made to be a clock of a frequency 5 times higher (112.896 MHz) and is divided by 1/2352 by the frequency divider 54, thereby becoming a clock of 48 kHz. This is sent to the VCXO 52, whereby it is synchronized with a 48-kHz clock from the input terminal 51. The PLL circuit 53 is used as a multiplier for multiplying a frequency to 5 times higher. The VCXO 52, the PLL circuit 53, and the frequency divider 54 constitute a clock generator for generating a 44.1-kHz clock synchronized with a 48-kHz clock for recording the PCM data of the digital VTR apparatus.

The clock of 22.5792 MHz (=44.1 kHz×512) from the VCXO 52 is sent to the 1-bit IF decoder 33 of the 44.1-kHz series circuit block 25, the 1-bit IF encoder 44, and the RAMs 34 and 43, and also is sent to the frequency divider 55 of the 44.1-kHz series circuit block 25, thereby driving these circuits. The frequency divider 55 generates a clock of 44.1 kHz by frequency-dividing a clock of 22.5792 MHz by 1/512, and retrieves a clock of 44.1 kHz from the output terminal 57 via a word sync output buffer 56. The switching of the word sync output buffer 56 may be configured in such a manner that the word sync output buffer 56 is controlled on the basis of the 1-bit data/PCM data output switching control signal from the input terminal 48, and when PCM data is to be output, word-synchronized or AES3 encoded PCM data of 48 kHz is output.

The clock of the frequency of 48 kHz×512 from the input terminal 21 is supplied to the AES3 decoder 13, the AES3 encoder 17, and the meter interface 22, and also is sent to the 1-bit data format encoder 35, the AES3 decoder 38, the 1-bit data format decoder 42, and the AES3 encoder 47, thereby driving these circuits.

In a manner similar to the related art, it is also possible to convert 1-bit data into multi-bit PCM data by a filtering process or the like and thereafter convert the sampling frequency into 48 kHz. In the example of FIG. 4, 1-bit data from the 1-bit IF decoder 33 is converted into multi-bit PCM data having a sampling frequency of 44.1 kHz by a 1-bit data to PCM converter 61. The sampling frequency of the multi-bit PCM data is converted into 48 kHz by a sampling rate converter 62, and this data is sent to the selected terminal a of a selector switch 63. PCM data from the AES decoder 13 is supplied to the selected terminal b of the selector switch 63, and the output data from the selector switch 63 is sent to the output terminal 14. The switching of the selector switch 63 is controlled on the basis of a 1-bit data/PCM data conversion input switching control signal from the input terminal 65. Furthermore, 1-bit data from the RAM 43 is converted into multi-bit PCM data having a sampling frequency of 44.1 kHz by the 1-bit data to PCM converter 61, the sampling frequency is converted into 48 kHz by the sampling rate converter 62, and the data is sent to the selected terminal a of the selector switch 67. PCM data from the input terminal 16 is supplied to the selected terminal b of the selector switch 67, and output data from the selector switch 67 is sent to the AES encoder 17. The switching of the selector switch 67 is controlled on the basis of a 1-bit data/PCM data conversion output switching control signal from the input terminal 66. A clock of 22.5792 MHz (=44.1 kHz×512) from the VCXO 52 is supplied to the 1-bit data to PCM converter 61 and the sampling rate converter 62, and a clock of 48 kHz×512 from the input terminal 21 is also supplied to the sampling rate converter 62.

In the digital VTR apparatus having the audio processor 10 configured as described above, PCM data (digital audio data) from the output terminal 36 (or 14) is sent to the recording system 103 of FIG. 1, and is, together with digital video data, recorded in such a manner as to sequentially form recording tracks 115 shown in FIG. 2 on the video tape 110. Therefore, also for the PCM data to be recorded, it is necessary to consider the relationship with a field/frame frequency of a video signal.

As field frequencies of a digital video signal, there are 60 Hz (60 fields/second) that is often used in the television broadcast systems using the NTSC method, and 59.94 Hz (59.94 fields/second). In the television broadcast systems using the PAL method, 50 Hz (50 fields/second) is often used. A method in which, by considering the correspondence with a movie (24 frames/second), the frame frequency is 24 Hz (24 frame/seconds) or 23.98 Hz (23.98 frames/second) is also known.

As shown in FIG. 7A, when the field frequency is 60 Hz, 1-bit data having a sampling frequency of 2.8224 MHz is 47040 (=2822400/60) bits per field, and 47040 bits may be allocated equally per field.

In comparison, when the field frequency is 59.94 Hz, 1-bit data having a sampling frequency of 2.8224 MHz is 47087.04 (=2822400/59.94) bits per field. Here, the fraction number of 0.04 bits per field becomes 1 bit at 25 fields. Therefore, as shown in FIG. 7B, by using 25 fields as one period, 1177176 (=47087.04×25) bits may be allocated. 47088 bits may be allocated to one field among 25 fields per period and 47087 bits may be allocated to 24 fields. For the identification of these fields, control may be performed so that a field ID (identification information) in which one "0" and 24 "1s" are repeated in a period of 25 fields is used, and 47088 bits are allocated to fields whose field ID is "0" and 47087 bits are allocated to fields whose field ID is "1".

Next, when the field frequency is 50 Hz, as shown in FIG. 8A, 1-bit data having a sampling frequency of 2.8224 MHz becomes 56448 (=2822400/50) bits per field, and 56448 bits may be allocated equally per field.

Furthermore, as shown in FIG. 8B, when the frame frequency is 24 Hz (field frequency is 48 Hz), 1-bit data having a sampling frequency of 2.8224 MHz becomes 117600 (=2822400/24) bits per frame, and becomes 58800 (=117600/2) bits per field. As a consequence, 58800 bits may be allocated equally for each field.

In comparison, when the frame frequency is 23.98 Hz (field frequency is 47.96 Hz), 1-bit data having a sampling frequency of 2.8224 MHz becomes 117717.6 (=2822400/23.98) bits per frame, and becomes 58858.8 (=117717.6/2) bits per field. Here, since the fraction number of 0.8 bits per field becomes 4 bits at 5 fields. As a consequence, as shown in FIG. 8C, by setting 5 fields as one period, 58858 bits may be allocated to one field among the 5 fields per period, and 58859 bits may be allocated to 4 fields. For the identification of these fields, control may be performed so that a field ID (fieldID) in which one "0" and four "1s" are repeated in a period of 5 fields is used, and 58858 bits are allocated to a field in which the field ID is "0" and 58859 bits are allocated to a field in which the field ID is "1".

Next, as a specific example of a data conversion process in the 1-bit data format encoder 35 of FIG. 4, a description will be given of a process for rearranging 1-bit data (the sampling frequency is 2.8224 MHz) allocated for each field in the manner described above and for converting the 1-bit data into multi-bit PCM data of 48 kHz.

When the field frequency is 60 Hz described above, PCM data having a sampling frequency of 48 kHz becomes 800 (=48000/60) samples per field. As shown in FIG. 9, the 800 samples are divided into 160 segments of 5 samples per segment, and segment identification information for identification, that is, a segment ID (SegmentID: 0 to 159), is attached to each segment. Here, part (A) of FIG. 9 shows a field pulse. Part (B) of FIG. 9 shows a sampling pulse of PCM data. Part (C) of FIG. 9 shows that one field is divided into 160 segments of 5 samples per segment. Five samples per segment, to be accurate, means that the length of one segment is a period of 5 samplings. When the field frequency is 60 Hz, as described above, 1-bit data, which is 47040 bits per field, may be allocated equally, and the data becomes 294 (=47040/160) bits per segment. In order to assign the 294 bits to a period of 5 samplings of one segment, 1 sampling period may be 58 bits, and the remaining 4 sampling periods may be each 59 bits. More specifically, by using a sampling period ID (FsID) that is information for identifying a sampling period, control may be performed so that a 5-sampling period is set as one period, one "1" and four "0s" are repeated, 58 bits are allocated to a sampling period in which the sampling period ID is "1", and 59 bits are allocated to a sampling period in which the sampling period ID is "0".

In the standard of the digital VTR apparatus of this embodiment, as described above, digital audio PCM data of 48 kHz/24 bits can be recorded and reproduced for 12 channels. In order to record and reproduce the 1-bit data for one channel, 58 bits or 59 bits are necessary per sampling period. As a consequence, 48 kHz/24-bit PCM data for three channels are used, and 58 bits or 59 bits among 24×3=72 bits are allocated for 1-bit data.

FIGS. 10A and 10B show such PCM data of 3 channels for the amount of 1 sampling period (24-bit data for 3 samples). One-bit data (D) of 58 bits is allocated to samples for 3 channels (3 samples) whose sampling period ID is "1" (FsID=1), shown in FIG. 10A, and 1-bit data (D) of 59 bits is allocated to 3 samples whose sampling period ID is "0" (FsID=0), shown in FIG. 10B. For example, 20 bits from the LSB among the 24-bits of 1 sample is set as an area for 1-bit data. For a 1-bit data area of a total of 60 bits for three channels, in the sampling period of FsID=1 in FIG. 10A, 20 bits are allocated to a first channel (1 ch), 19 bits are allocated to a second channel (2 ch), and 19 bits are allocated to a third channel (3 ch), thereby forming a total of 58 bits. Furthermore, in the sampling period of FsID=0 in FIG. 10B, 20 bits are allocated to a first channel (1 ch), 20 bits are allocated to a second channel (2 ch), and 19 bits are allocated to a third channel (3 ch), thereby forming a total of 59 bits. Furthermore, bits corresponding to the amount of three channels of 4 bits (a total of 12 bits) from the MSB among the 24 bits per sample are allocated for 8 bits (S0 to S7) for the segment ID (SegmentID), 2 bits (F0, F1) for the sampling period ID (FsID), and 2 bits (f0, f1) for the field ID (fieldID).

As has been described above, in the 1-bit data format encoder 35 of FIG. 4, 1-bit data having a sampling frequency of 2.8224 MHz (=64×44.1 kHz) for one channel is converted into 48 kHz/24-bit PCM data for three channels. It has already been described above that the data from the 1-bit data format encoder 35 is sent via the selector switch 28 and the output terminal 36 to the recording system 103 of FIG. 1, and the data, together with the digital video data, is recorded on the video tape 110. In the manner described above, 1-bit data for one channel can be recorded and reproduced by using 3 channels of the PCM data. In order to record and reproduce, for example, 1-bit data for two channels of stereo left and right, 48 kHz/24-bit PCM data corresponding to six channels may be used.

The above description shows an example in which 1-bit data for one channel is recorded in 3 channels of the 48 kHz/24-bit PCM data. When data recorded in 3 channels of the PCM data is to be reproduced as 1-bit data, an operation reverse to that described above may be performed. That is, reproduction data of 3 channels of the PCM data corresponding to the 1-bit data for one channel is supplied to the 1-bit data format decoder 42 of FIG. 4; 20 bits or 19 bits are retrieved from the 1-bit data area of the 20 bits among the 24 bits of each sample by using the segment ID, the sampling period ID, and the field ID and are written to the RAM 43 of FIG. 4; and bits are sequentially read at a sampling frequency of 2.8224 MHz, thereby making it possible to reproduce 1-bit data.

Next, when the field frequency is 59.94 Hz as shown in FIG. 7B described above, 1-bit data having a sampling frequency of 2.8224 MHz becomes 47087.04 (=2822400/59.94) bits per field. As a consequence, 25 fields are set as one period, 47088 bits are allocated to one field (fieldID=0) among the 25 fields per period, and 47087 bits are allocated to 24 fields (fieldID=1). However, in order to assign PCM data having a sampling frequency of 48 kHz to each field having a field frequency of 59.94 Hz, 20020 samples (sampling period) are formed at 25 fields, that is, 4004 samples are formed at 5 fields. As a consequence, 800 samples may be allocated to one field (5 fieldID=0) among the 5 fields per period, and 801 samples may be allocated to 4 fields (5 fieldID=1 to 4).

Figure 11:
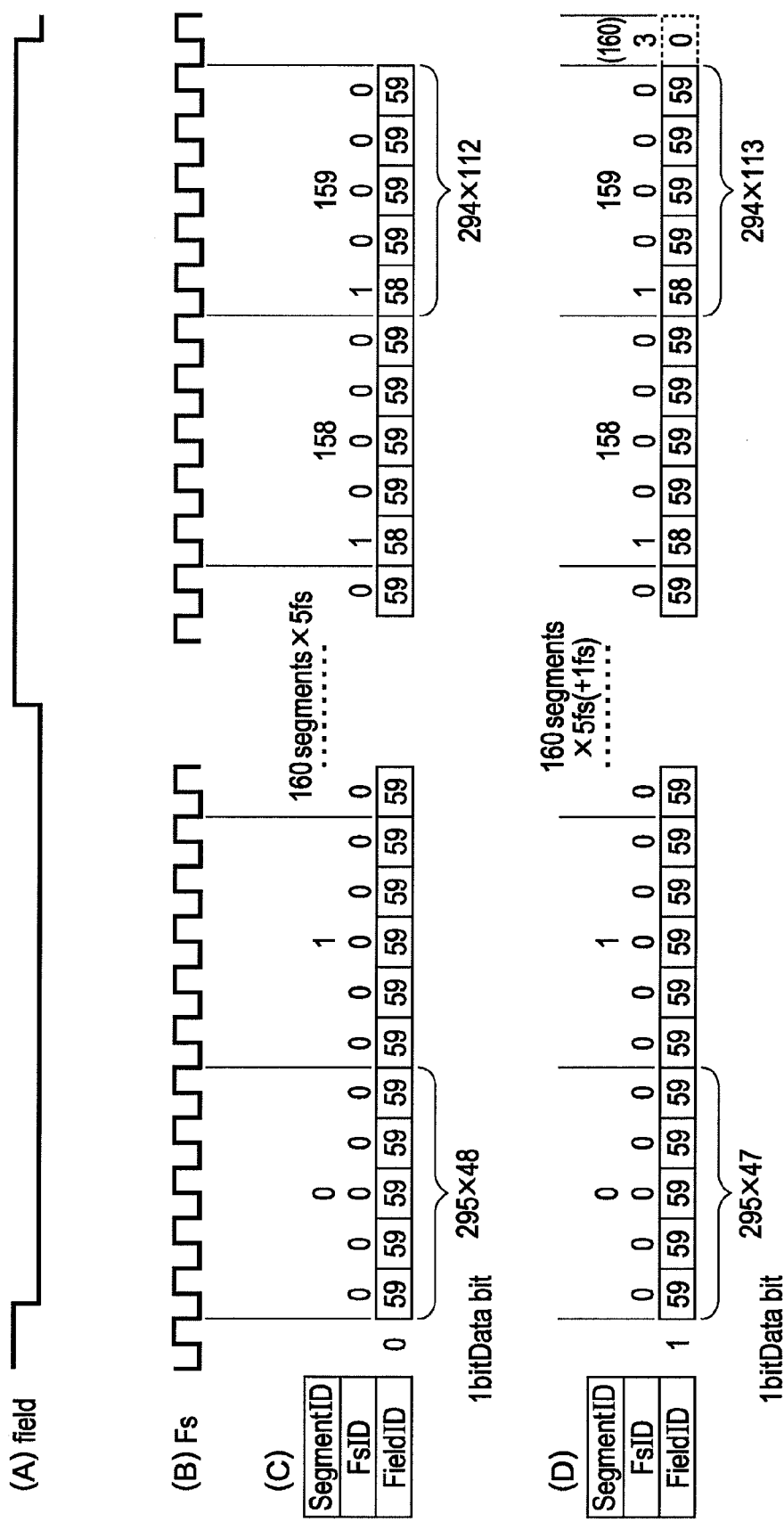
FIG. 11 illustrates the assignment of 1-bit data for each sampling period in one field when the field frequency is 59.94 Hz.

FIG. 11 shows the assignment of samples (sampling period) of PCM data having a sampling frequency of 48 kHz with respect to such a field having a field frequency of 59.94 Hz. Part (A) of FIG. 11 shows a field pulse, and part (B) of FIG. 11 shows a sampling pulse of PCM data. Part (C) of FIG. 11 shows a case in which 800 samples (sampling period) are allocated to one field (fieldID=0) among the fields per period. Part (D) of FIG. 11 shows a case in which 800 or 801 samples (sampling period) are allocated to each field of the remaining 24 fields (fieldID=1).

As shown in part (C) of FIG. 11, 800 samples (sampling period), that is, 160 segments (SegmentID=0 to 159) of a 5-sampling period per segment described above, are allocated to the field of fieldID=0.295 bits of 1-bit data are allocated to each of 48 segments among them, and 294 bits of 1-bit data are allocated to each of the remaining 112 segments, thereby 47088 bits of 1-bit data are allocated to the field of fieldID=0.

As shown in part (D) of FIG. 11, 800 or 801 samples (sampling period) are allocated to the remaining 24 fields (fieldID=1) among the 25 fields per period. This is realized by adding one segment (SegmentID=0 to 159) formed of 1 sampling period to 160 segments (SegmentID=160) such that the one segment is a 5-sampling period. In this case, 295 bits of 1-bit data are allocated to each of 47 segments among 160 segments of SegmentID=0 to 159, 294 bits of 1-bit data are allocated to each of the remaining 113 segments, and 1-bit data is not allocated (set as 0 bits) to one segment of SegmentID=160, thereby allocating 47087 bits of 1-bit data to the field of fieldID=1.

Here, in order to assign 294 bits to segments of a 5-sampling period per segment, as described in conjunction with FIG. 9 described above, the 1 sampling period (FsID=1) may be 58 bits, and the remaining 4 sampling period (FsID=0) may be 59 bits.

In order to assign 295 bits to one segment, by setting all the 5 sampling periods to FsID=0, 59 bits may be allocated to each of them. When there are 801 samples, one sampling period in which the sampling period ID is FsID=3 is allocated to one segment of SegmentID=160, which is the 801-th sample, so that 1-bit data is not contained (set as 0 bits).

FIG. 12A shows PCM data (24 bits×3 samples) for three channels when the sampling period ID is "1" (FsID=1). Similarly, FIG. 12B shows a case of FsID=0, and FIG. 12C shows a case of FsID=3. Since FIGS. 12A and 12B are identical to FIGS. 10A and 10B described above, the descriptions thereof are omitted. For the amount of three channels of 24 bits per sample of FIG. 12C, similarly to FIGS. 10A and 10B and FIGS. 12A and 12B, the amount of 4 bits (a total of 12 bits) from the MSB of each channel is allocated to 8 bits (S0 to S7) for the segment ID (SegmentID), 2 bits (F0, F1) for the sampling period ID (FsID), and 2 bits (f0, f1) for the field ID (fieldID). However, 1-bit data is not allocated (0 bits) to the amount of 20 bits (a total of 60 bits) from the LSB of each channel.

As a result of performing the above-described bit allocation, when the field frequency is 59.94 Hz, bit allocation can be performed at a rate of 47087.04 bits per field, that is, 1177176 bits of 1-bit data can be allocated to 25 fields. Also, in this case, 1-bit data for one channel having a sampling frequency of 2.8224 MHz (=64×44.1 kHz) can be recorded and reproduced by using 48 kHz/24-bit PCM data for three channels.

When the field frequency is 50 Hz or when the frame frequency is 24 Hz or 23.98 Hz, as shown in FIGS. 8A, 8B, and 8C described above, also, by considering the bit allocation per field and by adjusting the bit allocation for each sampling period, it is possible to record and reproduce 1-bit data by using 48 kHz/24-bit PCM data for several channels.

According to the above-described embodiments of the present invention, it is possible to minimize the deterioration of sound quality when 1-bit data of 44.1-kHz series is to be recorded and reproduced to and from a digital VTR apparatus in which the sampling frequency is 48-kHz series.

It should be understood by those skilled in the art that various modifications, combinations, sub-combinations and alterations may occur depending on design requirements and other factors insofar as they are within the scope of the appended claims or the equivalents thereof.

What is claimed is:

1. A digital recording apparatus for recording 1-bit digital audio data of a first sampling frequency on a recording medium in accordance with the recording format of multi-bit pulse code modulation data of a second sampling frequency, the digital recording apparatus comprising:
a storage section to which input 1-bit digital audio data of the first sampling frequency is written;
an encoder configured to read, from the storage section, the 1-bit digital audio data at a clock synchronized with the second sampling frequency and configured to convert the 1-bit digital audio data in such a manner that bits of the 1-bit digital audio data are arrayed in a 1-bit data area provided in the multi-bit pulse code modulation data that is in accord with the recording format; and
a recorder configured to record data output from the encoder on the recording medium in accordance with the recording format.

2. The digital recording apparatus according to claim 1, further comprising a clock generator for achieving synchronization between the first sampling frequency and the second sampling frequency and for generating a clock of an integral multiple of each sampling frequency,
wherein the 1-bit digital audio data that is input at the first clock of an integral multiple of the first sampling frequency from the clock generator is written in the storage section, 1-bit digital audio data is read from the storage section at a second clock of an integral multiple of the second sampling frequency, and the encoder is driven at the second clock.

3. The digital recording apparatus according to claim 2, wherein the first sampling frequency is 2.8224 MHz (=64×44.1 kHz), the second sampling frequency is 48 kHz,
the clock generator includes a master clock oscillator for generating a clock of a frequency 512 times as high as 44.1 kHz, a multiplier for multiplying a master clock from the master clock oscillator to be 5 times higher, and a frequency divider for frequency-dividing the clock from the multiplier by 1/2352, and outputs the master clock as the first clock, and
the clock 512 times as high as 48 kHz that is the second sampling frequency is used as the second clock.

4. The digital recording apparatus according to claim 1, wherein some bits of each sample of the multi-bit pulse code modulation data of the recording format, the some bits corresponding to a plurality of channels, are used as the 1-bit data area.

5. The digital recording apparatus according to claim 1, wherein the first sampling frequency is 2.8224 MHz (=64×44.1 kHz), the second sampling frequency is 48 kHz,
the recorder records 48 kHz/24-bit pulse code modulation data for 12 channels as the multi-bit pulse code modulation data together with digital video data, and
20 bits among 24 bits of each sample of the 48 kHz/24-bit pulse code modulation data are used as the 1-bit data area, and by using the 48 kHz/24-bit pulse code modulation data for three channels having the 1-bit data area, 1 channel of the 1-bit digital audio data is allocated.

6. The digital recording apparatus according to claim 5, wherein, by using identification information for identifying the correspondence with the field of the digital video data, the position in the field, and the number of allocated bits with respect to the 48 kHz/24-bit pulse code modulation data, the identification information is arranged in an area of 12 bits for three channels of 4 bits, excluding the 1-bit data area, among the 24 bits of each sample of the pulse code modulation data.

7. A digital recording method for recording 1-bit digital audio data of a first sampling frequency on a recording medium in accordance with the recording format of multi-bit pulse code modulation data of a second sampling frequency, the digital recording method comprising the steps of:
receiving the 1-bit digital audio data of the first sampling frequency and writing the 1-bit digital audio data on a storage section;
reading the 1-bit digital audio data from the storage section at a clock synchronized with the second sampling frequency;
encoding the 1-bit digital audio data read from the storage section in such a manner that bits are arrayed in a 1-bit data area provided in the multi-bit pulse code modulation data that is in accord with the recording format; and recording the encoded output data on a recording medium in accordance with the recording format.

8. A digital data conversion apparatus for converting 1-bit digital audio data of a first sampling frequency in accordance with the recording format of multi-bit pulse code modulation data of a second sampling frequency, the 1-bit digital audio data being recorded on a recording medium in accordance with the recording format, the digital data conversion apparatus comprising:
- a storage section to which input 1-bit digital audio data of the first sampling frequency is written; and
- an encoder configured to read, from the storage section, the 1-bit digital audio data at a clock synchronized with the second sampling frequency and configured to convert the 1-bit digital audio data so that bits of the 1-bit digital audio data are arrayed in a 1-bit data area provided in the multi-bit pulse code modulation data that is in accord with the recording format.

9. A digital reproduction apparatus for reproducing a recording medium on which 1-bit digital audio data of a first sampling frequency is recorded in accordance with the recording format of multi-bit pulse code modulation data of a second sampling frequency, the digital reproduction apparatus comprising:
- a reproduction section configured to read the multi-bit pulse code modulation data that is in accord with the recording format of the recording medium, the multi-bit pulse code modulation data being converted and recorded on the recording medium in such a manner that bits of the 1-bit digital audio data are arrayed in a 1-bit data area provided in the multi-bit pulse code modulation data that is in accord with the recording format;
- a decoder configured to return data from the 1-bit data area provided in the multi-bit pulse code modulation data reproduced by the reproduction section to a data sequence of the 1-bit digital audio data and configured to output the data sequence at a clock synchronized with the second sampling frequency; and
- a storage section to which the 1-bit digital audio data of the second sampling frequency from the decoder is written and from which the original 1-bit digital audio data is read at a clock synchronized with the first sampling frequency.

10. A digital reproduction method for reproducing a recording medium on which 1-bit digital audio data of a first sampling frequency is recorded in accordance with the recording format of multi-bit pulse code modulation data of a second sampling frequency, the digital reproduction method comprising the steps of:
- reading multi-bit pulse code modulation data that is in accord with the recording format of the recording medium, the multi-bit pulse code modulation data being converted and recorded on the recording medium in such a manner that bits of the 1-bit digital audio data are arrayed in a 1-bit data area provided in the multi-bit pulse code modulation data that is in accord with the recording format;
- performing decoding in such a manner that data from the 1-bit data area provided in the multi-bit pulse code modulation data reproduced in the reproduction is returned to a data sequence of the 1-bit digital audio data and is output at a clock synchronized with the second sampling frequency;
- writing the 1-bit digital audio data of the second sampling frequency to a storage section, the 1-bit digital audio data being decoded in the decoding; and
- reading the original 1-bit digital audio data from the storage section at a clock synchronized with the first sampling frequency.

* * * * *